United States Patent [19]

Scholz

[11] 4,089,237
[45] May 16, 1978

[54] CHANGE SPEED TRANSMISSION IN RANGE-TYPE DESIGN FOR MOTOR VEHICLES

[75] Inventor: Helmut Scholz, Delrath, Germany

[73] Assignee: International Harvester Company, Chicago, Ill.

[21] Appl. No.: 680,250

[22] Filed: Apr. 26, 1976

[30] Foreign Application Priority Data

Apr. 25, 1975 Germany .............................. 2528528

[51] Int. Cl.² ............................................. F16H 37/06
[52] U.S. Cl. ........................................ 74/681; 74/740; 74/785
[58] Field of Search ................. 74/665 R, 665 B, 674, 74/681, 740

[56] References Cited

U.S. PATENT DOCUMENTS

| 2,853,890 | 9/1958 | Kelbel ..................... | 74/740 |
|---|---|---|---|
| 3,429,202 | 2/1969 | Gelicher .................. | 74/740 |
| 3,589,483 | 6/1971 | Smith ..................... | 74/681 |
| 3,654,822 | 4/1972 | Muir et al. ............... | 74/681 |
| 3,659,479 | 5/1972 | Kiss ....................... | 74/681 |
| 3,837,237 | 9/1974 | Rossler et al. ............ | 74/740 |

FOREIGN PATENT DOCUMENTS 68,707 12/1944 Norway .................. 74/740

*Primary Examiner*—Stephen C. Bentley
*Attorney, Agent, or Firm*—Raymond E. Parks; Frederick J. Krubel; F. David AuBuchon

[57] ABSTRACT

A multi-speed gear transmission in which the available speed ratios are increased by the addition of planetary gearing in an intermediate drive transmission unit which is between a change speed transmission unit and a range and direction of travel transmission unit. The planetary ring gear is provided with an external gear ring portion which is selectively driven by either a primary power shaft or by an auxiliary power shaft or by the power output shaft, and also can be braked and connected directly to the output shaft to provide the additional speed ratios.

7 Claims, 2 Drawing Figures

CHANGE SPEED TRANSMISSION IN RANGE-TYPE DESIGN FOR MOTOR VEHICLES

BACKGROUND OF THE INVENTION

The invention relates to a change-speed transmission for motor vehicles, farm and industrial tractors in particular, featuring a drive clutch, a gear-shift transmission unit, a range-shift transmission unit with one or several forward speeds and a reverse speed, and an additional intermediate drive.

DESCRIPTION OF THE PRIOR ART

A change-speed transmission known having gear-shift, intermediate drive, and range selection transmission units is known by the International Harvester Company mbH published German patent specification, DAS No. 1,530,901, filed on Aug. 11, 1964, and published on Feb. 5, 1970, with Otto A. Bohner and Helmut Scholz named as co-inventors. On this known change-speed transmission the intermediate transmission can — by means of a friction contact clutch — be engaged optionally in the power flow together with the range shift transmission which is also engageable via a friction contact clutch whereby the power output-shaft can be driven directly either by the engaged intermediate drive or the engaged range-shift transmission. Although this known change-speed transmission already has a comparatively large number of speeds, practical application proved that a further increase in the number of speed stages would be desirable. To achieve such an extension of the change-speed transmission by several speed ratios at economically justifiable cost, it is essential to change as little as possible the arrangement of the change-speed transmission in view of its basic design.

The invention is based on the realization that an increase of the gear stages can be achieved by simple means if the friction clutch pack of the original intermediate drive is replaced by an epicyclic gearing unit, whereby said unit will render possible the desired increase in gear ratios.

SUMMARY OF THE INVENTION

Therefore, the invention is based on the objective of providing for motor vehicles, farm and industrial tractors in particular, a suitable change-speed transmission in range-type design of the initially mentioned kind which — due to an increase in gear stages to be achieved at structurally negligible expenditure — distinguishes itself by an even larger range of gear ratios. According to the invention this problem is solved by adding to the intermediate drive gear unit a sun-and planet gear, the planetary ring gear of which can be externally by three separate power sources. The intermediate drive unit which according to the invention is designed as sun and planetary gearing can be installed as a complete unit in the place of the friction clutch pack in the original intermediate drive unit provided on the known DAS No. 1,530,901 change-speed transmission. In the manner of the unit existing design of the known transmission can be adhered to, particularly modification in the mutual arrangement of the individual shafts of the transmission units. Thus a considerable simplification in manufacturing the change-speed transmission is achieved, since it can be built without any considerable modification of the production machine tools. By driving the planetary ring gear externally, a multitude of transmission ratios can be realized. In principle it is of no consequence to the invention at which location the intermediate gear unit is placed in the overall transmission. However, in an appropriate design the planetary drive is located between the gear-shift transmission unit and range-shift transmission unit. With such an arrangement the sun pinion of the planetary gear is preferably driven by the countershaft of the gear-shift transmission unit, and the planet gear carrier is in drive connection with the countershaft of the range-shift transmission unit.

As regards this invention, it is of utmost importance that the planetary gear ring is driven by the final drive shaft of the range-shift transmission unit. For this purpose a sliding pinion is provided which is movably supported on the final drive shaft and has to be forced into engagement with external gearing providing on the circumference of the planetary gear ring. By shifting the sliding pinion to a second position it can also be meshed with the main drive shaft of the gear-shift transmission unit, so that — on the one hand — the inner gear ring can be driven by the final drive shaft of the range shift transmission unit while — on the other hand — it can be driven by the main drive shaft of the gear-shift transmission unit.

Furthermore, the gear ring of the planetary drive can be driven by an auxiliary or second power shaft which is independently driven, irrespective by the vehicle engine of the vehicle traveling or not. For this purpose a sliding ratchet wheel is provided on the auxiliary shaft whereby the ratchet wheel can be glared to the external gearing on the planetary gear ring. By this drive additional speed ratios also be achieved.

Furthermore, the planetary gear ring can be braked. For this purpose a band brake is provided which acts upon the outer circumference of the planetary gear ring.

Furthermore, a drive connection is also provided between the gear ring and the countershaft of the range-shift transmission unit which can be disconnected planetary obtain additional speed ratios. This is effected by providing a dog clutch between a splined hub section of the gear ring and the countershaft of the range-shift transmission unit.

BRIEF DESCRIPTION OF THE DRAWING

A preferred embodiment of the invention is displayed in the drawing and is described in detail in which.

DESCRIPTION OF THE PREFERRED EMBODIMENT

Figure 1:
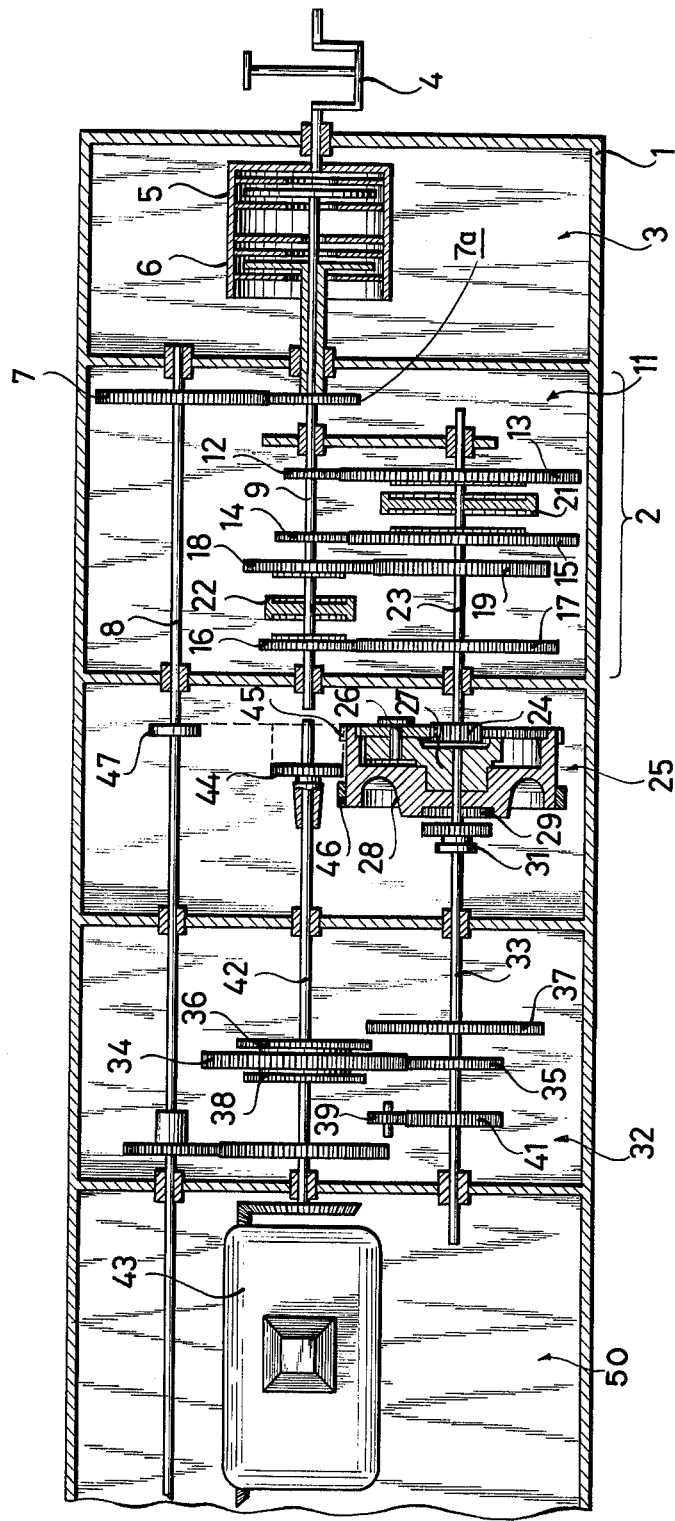
FIG. 1 shows a schematic representation of a change-speed range selector with an intermediate drive unit incorporating a planetary gear drive.

FIG. 1 shows that the illustrated change-speed transmission has a gear box or housing 1, divided by separating walls 2 into several — in this case 5 — chambers 3, 11, 25, 32 and 50 in which the transmission units (explained in detail later on) of the change-speed range selector several transmission are accommodated. On a crankshaft 4 extending into the front face of the transmission housing 1 and driven by a drive engine (not shown) a first dry-type clutch 5 and a separate second dry-type clutch 6 are arranged. Both dry-type clutches 5, 6 can be combined into a single clutch pack unit. Clutch 6 is connected to constant mesh gears 7, 17a which drive an auxiliary shaft or secondary power shaft 8 supported laterally in the transmission housing 1. Parallel to the auxiliary shaft 8 there is a main drive shaft 9 of the gear-shift transmission unit 11 connected to clutch 5. The four speeds of the gear shift transmission unit 11 are as follows: first speed gear ratio: gears 12 and 13; second speed gear ratio: gears 14 and 15; third speed gear ratio: gears 16 and 17; and fourth speed gear ratio: gears 18 and 19. Between the driven gear wheels 13 and 15, a first gear-shifting mechanism 21 is arranged, and between the drive gear wheels 16 and 18 a second gear-shifting mechanism 22 is provided. By means of said gear-shifting mechanisms the selected speed gear ratio can be engaged to the power flow.

Parallel to the main drive shaft 9 a main or first countershaft 23 is arranged. On the main or first countershaft 23 a sun gear 24 is arranged which is included in the intermediate drive transmission unit 25. Planetary gear wheels 26 mesh with the sun gear 24 and are carried by the planet gear carrier 27. Carrier 27 is splined onto a second countershaft 33 which is part of the range selector transmission unit 32. The planetary gear ring 28 has internal gear teeth 51 meshing with the planetary gears 26. A hub section 29 of the planetary gear ring 28 is provided with dog clutch means 31 which can be put in drive connection with the second main countershaft 33 belonging to the range-shift transmission 32. The range-shift transmission unit 32 has the gear wheels 34 and 35 for a field speed ratio range, the gear wheels 36 and 37 for a road speed ratio range, and the gears wheels 38, 39, and 41 for a reverse speed ratio range. The gear wheels 35, 36, and 38 are a cluster of sliding gears movably supported on a power output shaft or bevel pinion shaft 42 which extends parallel to the countershaft 33 of the range-shift transmission unit 32 and coplanar with the main drive shaft 9. By the selection of the vehicle operator either the field range, the road range, or the reverse range of the range shifting transmission 32 can then be engaged to the transmission power flow. In a known manner a final drive 43, not described in detail, is driven by the bevel tubular gear means shaft 42.

Figure 2:
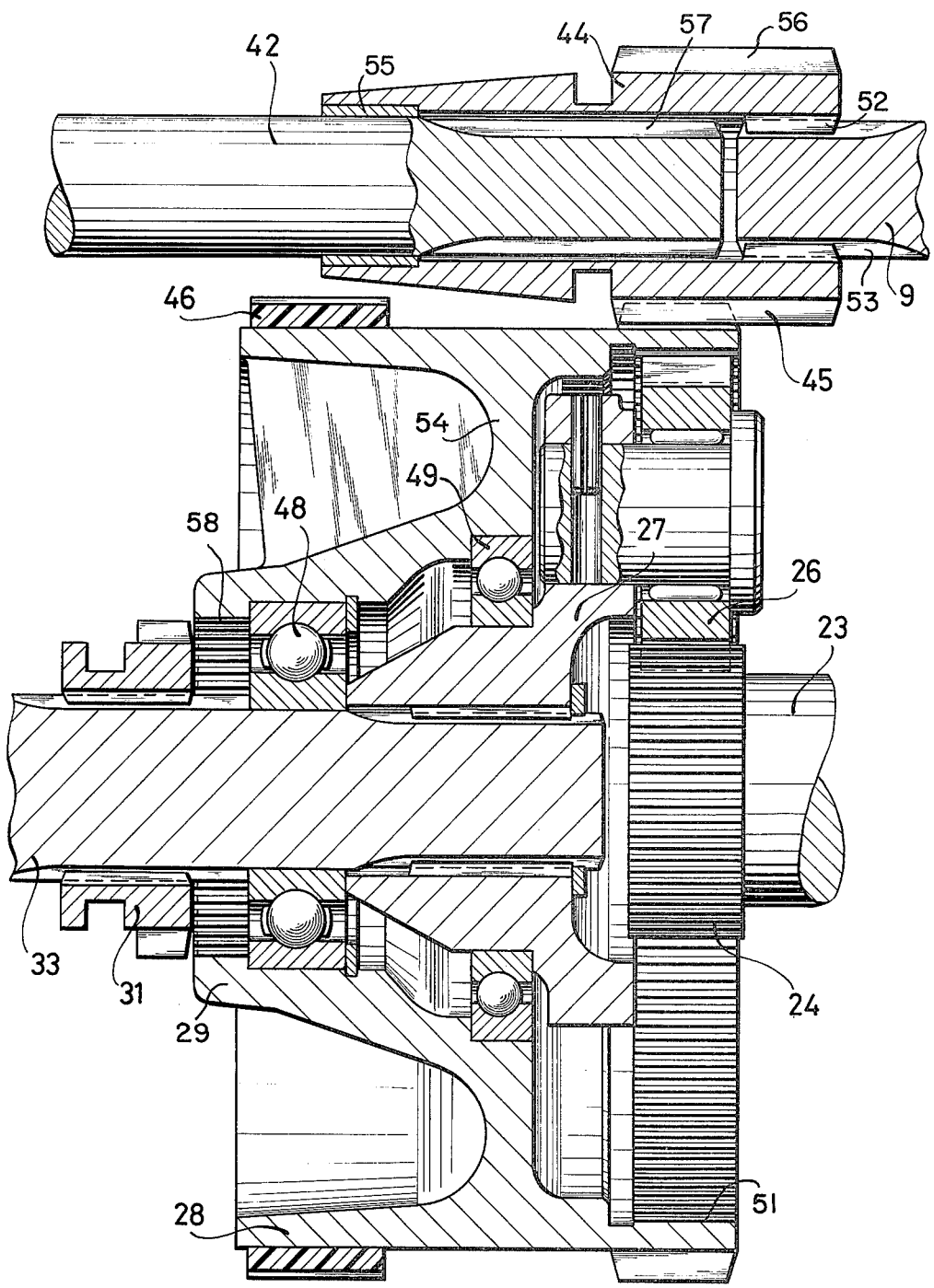
FIG. 2 shows an enlarged cross section through the planetary gear drive.

On the bevel pinion shaft 42 a sliding pinion 44 is arranged in an axially movable manner. The sliding tubular gear means has a pinion which 44 can be engaged to the external gear ring portion 45 provided on the outer circumference of the planetary gear ring 28, so that the planetary gear ring 28 can be driven in a rotating manner. Furthermore, as shown in FIG. 2 the sliding pinion 44 of the tubular gear means has an internal spline portion 52 which can be thrown into a force-locking engagement with a mating splined portion 53 on the main drive shaft 9. Finally, the sliding pinion 44 can be moved to a neutral position where there is no drive connection, with either the external gearing 45 of the gear ring 28 or with the main drive shaft 9. To brake the planetary gear ring 28 a band brake 46 acts upon the periphery of the gear ring 28.

Ultimately, the planetary gear ring 28 can also be driven by a ratchet wheel 47 arranged on the auxiliary power shaft 8. Actuating elements not shown in detail are used to actuate the dog clutch 31, the band brake 46, the sliding pinion 44, and the ratchet wheel 47.

As shown in FIG. 2, the hub portion 29 of the gear ring 28 is supported on the rear countershaft 33 by means of a first antifriction bearing 48, while a web portion 54 is supported on the carrier 27 by means of a second antifriction bearing 49.

The operating characteristics of the change-speed transmission according to this invention will now be explained. Supposing the dog-clutch 31 and the band brake 46 are released and the sliding pinion 44 has been moved axially along the bevel pinion shaft 42 to the right so that it can rotate on the bevel pinion shaft 42 on bearing 55 and internal spline 52 is in force-locking engagement with the external spline 52 on main drive shaft 9. In this position the left side of the gear teeth 56 on the sliding pinion 44 still remain engaged with the external gearing 45 of the gear ring 28. Thus the gear ring 28, by way of the sliding pinion 44, is driven in a rotating manner by the main drive shaft 9. Simultaneously, by way of one of the engaged sets of speed ratio gears 12–13, 14–15, 16–17, or 18–19, the sun gear 24 is driven, and together with it the planetary wheels 26 and the carrier 27. Due to the simultaneous external and internal driving of the gear ring 28 a differential speed of rotations develops at the carrier 27 which is transferred to the countershaft 33 of the range-shift transmission unit 32. In the range-shift transmission unit 32 either the field range gear sets 34-35 or the road range gear sets 36-37 can be engaged. By the mode of operation described above a total of eight different transmission ratios can be obtained.

The second possible mode of driving the gear ring 28 is achieved by moving the sliding pinion 44 slightly to the left, while the dog clutch 31 and the band brake 46 are released. Then the sliding pinion 44, via its internal spline-type gearing 52 is in a force-locking engagement with the splined end 57 on the bevel pinion shaft 42. As before the external gearing 45 on the gear ring 28 remains in a force-locking engagement with the external gearing 45 but now on the right side of the gearing. The sun gear 24 of the intermediate drive 25 is again driven in a rotating manner and at a corresponding speed by a gear set ratio selected from the gear-shift transmission train 11. Simultaneously the planetary wheels 26 and the carrier 27 are driven, and together with them also the countershaft 33 of the range-shift transmission unit 32. Either by way of the field range gear ratio sets 34–35 or via the road range gear ratio sets 36–37 the power flow can be transferred to the bevel pinion shaft 42 from where it is transferred to the external glaring 45 on the gear ring 28 via the sliding pinion 44. Since this way the gear ring 28 is driven, too, a differential speed of rotations develops in the intermediate drive 25 from where it is transferred via the range-shift transmission 32 to the bevel pinion shaft 42 and to the final reduction drive 43. Through the four selectable gear set ratio of the gear-shift transmission train 11 and the two ranges of the range-shift transmission 32 in this case, too, a total of eight forward speeds is obtained.

The third possible mode of driving the gear ring 28 is achieved by way of the ratchet wheel 47 which is arranged on the auxiliary counter shaft 8 and can be shifted. For this purpose the sliding pinion 44 is moved to the exterme teeth 56 on the sliding pinion 44 no longer mesh with the teeth on the external gearing 45 of the gear ring 28. There is, of course, a locking mechanism (not shown in detail) provided between the sliding pinion 44 and the ratchet wheel 47 to prevent accidental or careless simultaneous engaging of the sliding pinion 44 and the ratchet wheel 47. The sun gear 24, the planetary gears 26 and the carrier 27 as before are driven by one of the selected gears of the gear-shift transmission train 11 simultaneously with the ring gear 28 being driven externally by the ratchet wheel 47. By simultaneous driving of the gear ring 28 via the ratchet wheel 47, yet another differential speed of rotations is produced which is transferred from the carrier 27 to the countershaft 33 of the range-shift transmission 32. In the range-shift transmission 32, again either the field range or the road range can be engaged, so that in this case, too, a total of eight forward speeds is obtained.

A fourth possible mode of increasing the number of transmission ratios can be realized by braking the gear ring 28 by means of the band brake 46. As before the dog clutch 31 remains disengaged and the sliding pinion 44 remains in the extreme leftward or neutral position so that it does not exercise any drive effect. When the inner gear ring 28 is braked, the power is transferred via one of the selected gears of the gear-shift transmission train 11, to the sun gear 24 which drives the planetary gear wheels 26 and the carrier 27, from where the power flow is transferred to the countershaft 33 of the range-shift transmission unit 32, were again either the field range or the road range can be selected. With this particular mode of drive a total of eight different forward speed transmission ratios is produced, too.

Finally, there is a fifth possible mode of driving the gear ring 28 in a rotating manner. In this case the band brake 46 is released, and the sliding pinion 44 and the ratchet wheel 47 remain in their disengaged position. However, the dog clutch 31 is shifted to the right into an engaged position with the spline teeth 58 in the hub 29 of the ring gear 28, so that the gear ring 28 and the countershaft 33 of the range-shift transmission 32 are row splined together to the countershaft 33. Now the intermediate drive transmission unit 25 acts as clutch, between the change-speed transmision unit 11 and the range-shift transmission unit 32. Thus the power flow is transferred from the countershaft 23 to the countershaft 33 via the sun gear 24, the carrier 27, and the gear ring 28, and the dog clutch 31. By this possibility of selecting four speeds from the gear-shift transmission train 11 and of selecting by way of the range-shift transmission 32 either the field or the road range, in this case, too, a total of eight forward gear speeds can be produced.

By means of the arrangement described in this invention a change-speed transmission has been developed on which by installation of a planetary drive in place of the known clutch in the intermediate drive a total of 40 forward speeds instead of the original 12 forward speeds is produced. The arrangement also does not alter the change-speed transmission unit or the and range-shift transmission unit.

Such a design offers the advantage of facilitating the selective installation of either a conventional intermediate drive or the planetary drive described in this invention in the change-speed transmission without necessitating any major changes on the change-speed transmission itself. The result is a considerable simplification in manufacturing said change-speed transmission as well as the possibility of an extremely advantageous universal application. The change-speed transmission featured in this invention is most suitable for farm tractor application, where a comparatively large number of gear speeds is a necessity.

I claim:
1. Change-speed transmission for motor vehicles, in particular for use in agricultural and industrial types of tractors having an engine, a gear-shift transmission unit, an intermediate drive transmission unit, and a range-shift transmission unit having at least two forward speed ranges and one reverse speed, characterized by:
the intermediate drive unit having a planetary drive arrangement whereby the planetary gear ring is driven externally by means selectively connectable to a power source, and the sun gear of the planetary drive is connected to a first countershaft forming a part of the gear-shift transmission unit and is driven thereby, and the planetary gear carrier of the planetary drive is connected to and drives a second countershaft forming a part of the range-shift transmission unit; and,
the selectively connectable means comprising a sliding tubular gear means sleeved over a power output shaft of the range-shift transmission unit, and an external gear ring portion around the circumference of the planetary gear ring, the gear means and the output shaft each having mating splined portions in one axial moved position of the gear means along the output shaft and the gear means meshing with the gear ring portion in the one axial position for transferring power from the range-shift transmission to the planetary gear ring in a selected one of the two forward speed ranges.

2. Change-speed transmission according to claim 1, further characterized by:
a splined portion on a power shaft of the change speed transmission unit mating with the splined portion of the gear means in a second axial moved position of the gear means along the output shaft and the gear means meshing with the gear ring portion, a non-splined portion in the gear means disengaging the gear means from the splined portion of the output shaft in the second axial position for transferring power from the change-speed transmission unit to the planetary gear ring at the speed of the power shaft.

3. Change-speed transmission according to claim 2, further characterized by:
the gear means having a third axial moved position along the output shaft into a neutral position unmeshing the gear means from the gear ring portion.

4. Change-speed transmission according to claim 3, further characterized by:
a brake band means adjacent the gear ring portion on the planetary gear ring for braking the planetary gear ring in the third axial position of the gear means for transferring power from the change-speed transmission unit to the range-shift transmission unit at a differential speed between the speed of the sun gear and the speed of the planetary carrier.

5. Change-speed transmission according to claim 3, further characterized by:
a dog clutch means between the second countershaft and the planetary gear ring connecting the planetary gear ring in the third axial position of the gear means to the second countershaft for directly transferring power from the change-speed transmission unit to the range-shift transmission unit at a selected speed ratio of the change-speed transmission unit.

6. Change-speed transmission according to claim 3, further characterized by:
an auxiliary power shaft geared for driving to the engine, and the selectively connectable means further includes a ratchet gear wheel mounted on the auxiliary power shaft, and drive means connecting the ratchet gear wheel to the gear portion in the third axial moved position of the gear means for transferring power from the engine to the planetary gear ring at the speed of the auxiliary power shaft.

7. Change-speed transmission for motor vehicles, in particular for use in agricultural and industrial types of tractors having an engine, a gear-shift transmission unit, an intermediate drive transmission unit, and a range-shift transmission unit having at least two forward speed ranges and one reverse speed, characterized by:

the intermediate drive unit having a planetary drive arrangement whereby the planetary gear ring is driven externally by means selectively connectable to a power source, and the sun gear of the planetary drive is connected to a first countershaft forming a part of the gear-shift transmission unit and is driven thereby, and the planetary gear carrier of the planetary drive is connected to and drives a second countershaft forming a part of the range-shift transmission unit; and, the selectively connectable means comprising a sliding tubular gear means sleeved over a power output shaft of the range-shift transmission unit, an external gear portion around the circumference of the planetary gear ring, and a splined portion on a power shaft of the change-speed transmission unit mating with a splined portion in the gear means in an axial moved position of the gear means along the output shaft and the gear means meshing with the gear portion in the axial moved position for transferring power from the change-speed transmission unit to the planetary gear ring at the speed of the power shaft.

* * * * *